US008364469B2

(12) United States Patent
Neale (10) Patent No.: US 8,364,469 B2
(45) Date of Patent: Jan. 29, 2013

(54) NATURAL LANGUAGE ENHANCED USER INTERFACE IN A BUSINESS RULE MANAGEMENT SYSTEM

(75) Inventor: Michael D. Neale, Paddington (AU)

(73) Assignee: Red Hat, Inc., Raleigh, NC (US)

( * ) Notice: Subject to any disclaimer, the term of this patent is extended or adjusted under 35 U.S.C. 154(b) by 1013 days.

(21) Appl. No.: 11/986,923

(22) Filed: Nov. 26, 2007

(65) Prior Publication Data

US 2009/0138258 A1    May 28, 2009

(51) Int. Cl.
 *G06F 17/27* (2006.01)
(52) U.S. Cl. ........... 704/9; 379/88.01; 704/10; 704/275; 704/7; 709/206; 709/232; 715/234; 715/866; 717/106
(58) Field of Classification Search ................. 709/232, 709/206; 715/234, 866; 717/106; 704/9, 704/10, 275, 7; 379/88.01
See application file for complete search history.

(56) References Cited

U.S. PATENT DOCUMENTS

| | | | |
|---|---|---|---|
| 6,289,513 B1 * | 9/2001 | Bentwich | 717/106 |
| 6,714,939 B2 * | 3/2004 | Saldanha et al. | 1/1 |
| 6,961,705 B2 * | 11/2005 | Aoyagi et al. | 704/275 |
| 2002/0120701 A1 * | 8/2002 | Ohba | 709/206 |
| 2003/0081017 A1 * | 5/2003 | Shenassa et al. | 345/866 |
| 2003/0154068 A1 * | 8/2003 | Tokuda et al. | 704/7 |
| 2003/0167266 A1 * | 9/2003 | Saldanha et al. | 707/6 |
| 2004/0168119 A1 * | 8/2004 | Liu et al. | 715/501.1 |
| 2005/0066050 A1 * | 3/2005 | Dharamshi | 709/232 |
| 2005/0135571 A1 * | 6/2005 | Bangalore et al. | 379/88.01 |
| 2006/0100858 A1 * | 5/2006 | McEntee et al. | 704/10 |
| 2007/0129937 A1 * | 6/2007 | Kellet et al. | 704/9 |
| 2009/0018822 A1 * | 1/2009 | Rouvellou et al. | 704/10 |

* cited by examiner

*Primary Examiner* — Michael Colucci
(74) *Attorney, Agent, or Firm* — Lowenstein Sandler PC (57) ABSTRACT

Some embodiments of a natural language enhanced user interface in a business rule management system have been presented. In one embodiment, one or more rule templates in a natural language are generated from one or more prefabricated sentences. Then a user interface is created using the one or more rule templates to allow a user to compose rules for a business rule management system.

22 Claims, 6 Drawing Sheets

NATURAL LANGUAGE ENHANCED USER INTERFACE IN A BUSINESS RULE MANAGEMENT SYSTEM

TECHNICAL FIELD

Embodiments of the present invention relate to business rule management, and more specifically to user interface in a business rule management system (BRMS).

BACKGROUND

In general, a rule is a logical construct for describing the operations, definitions, conditions, and/or constraints that apply to some predetermined data to achieve a goal. Conventionally, business languages and business software (e.g., spreadsheets) may be expressed in terms of business rules. For example, in an application that determines mortgage qualification of an applicant, an age requirement may be expressed in a rule requiring the age of an applicant to be over eighteen.

In general, a BRMS broadly refers to a system that manages business rules. Conventionally, users may compose and input business rules to a BRMS, which may store and process the business rules. For example, one existing BRMS evaluates rules against data to determine if the conditions of any of the rules are satisfied. If the conditions of a rule are satisfied by the data, then there is a match, and the rule may be subsequently executed. As a result of the execution, consequence specified in the rule may be realized. Unlike conventional business software, some business rules are generally easier to compose, and hence, lay people other than software developers, may be able to compose and submit business rules to the BRMS as well.

However, it may still be difficult for lay people to compose more advanced business rules because the construct, structure, and/or syntax of the more advanced business rules may be more complicated. Moreover, as the number of rules in an application increases, it also becomes more time-consuming to compose so many rules for the application.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a natural language enhanced user interface in a business rule management system (BRMS). As discussed above, a BRMS broadly refers to a system that manages business rules. For instance, some embodiments of the BRMS may store rules, evaluate rules, and execute rules based on results of rule evaluation. In some embodiments, one or more rule templates in a natural language are generated from one or more prefabricated sentences. The prefabricated sentences are written in the natural language as well. A natural language as used herein generally refers to a language written or spoken by humans for general-purpose communication, as opposed to constructs, such as computer-programming languages, machine-readable or machine-executable languages, or the languages used in the study of formal logic, such as mathematical logic. Some examples of a natural language include English, German, French, Russian, Japanese, Chinese, etc. In some embodiments, the prefabricated sentences are business rules previously submitted by end users. The prefabricated sentences may also include rules (e.g., business rules) and/or sentences provided by administrators of the BRMS and/or developers of the BRMS. Then a user interface is created using the rule templates to allow a user to compose rules for the BRMS.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium or a computer readable medium, such as, but is not limited to, any type of disk including magnetic-optical disks, read-only memories (ROMs), random access memories (RAMs), EPROMs, EEPROMs, floppy disks, optical disks, Compact Diskettes-ROMs (CD-ROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1A:
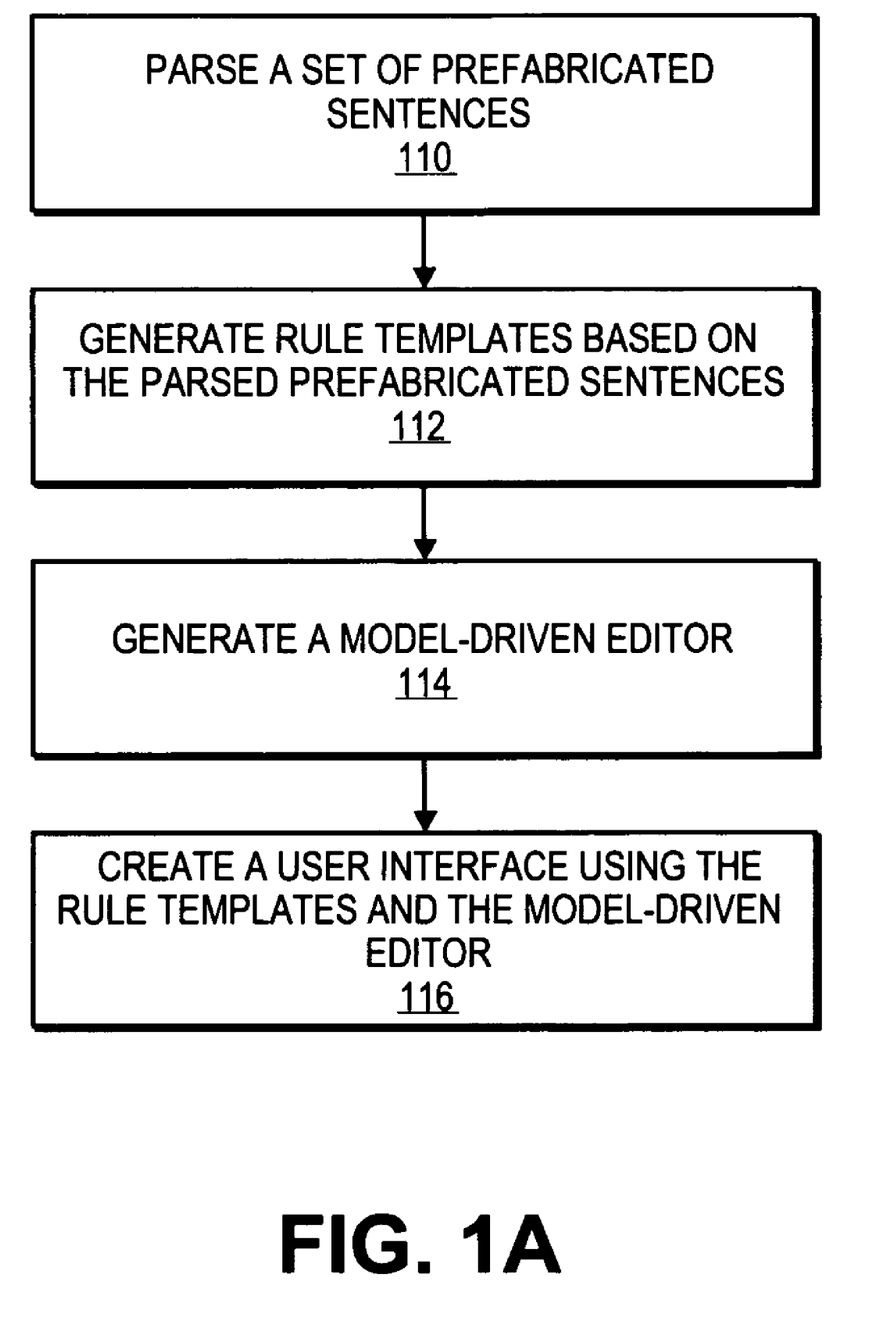
FIG. 1A illustrates one embodiment of a process to create a user interface in a business rule management system.

FIG. 1A illustrates one embodiment of a process to create a natural language enhanced user interface in a BRMS. The process may be performed by processing logic that may comprise hardware (e.g., circuitry, dedicated logic, programmable logic, microcode, etc.), software (such as instructions run on a processing device), firmware, or a combination thereof. For example, the application server 210 shown in FIG. 2 may perform at least part of the process.

Initially, processing logic parses a set of one or more prefabricated sentences (processing block 110). The prefabricated sentences are written in a natural language as defined above. In some embodiments, the prefabricated sentences include business rules previously submitted by end users. For example, one prefabricated sentence is: "If age of driver exceeds 70, then reject automobile insurance application because driver is too old." The prefabricated sentences may also include rules (e.g., business rules) and/or sentences provided by administrators and/or developers of the BRMS.

In some embodiments, processing logic generates one or more rule templates based on the parsed prefabricated sentences (processing block 112). A rule template as used herein broadly refers to a template usable by end users to compose rules in the BRMS. The rule template may include a predetermined sentence structure, which has one or more predetermined keywords (e.g., "if," "then," "until," etc.), and one or more user input fields. Users may enter user input into the user input fields and/or select an entry from a list of predetermined entries (e.g., a drop-down list of operators, a drop-down list of states in a country, etc.). The user input may include alphanumeric strings or expressions, numeric values, symbols (e.g., Δ, μ, etc.), operators (e.g., >, <, +, etc.), etc. Some examples of a rule template are shown in FIGS. 1B and 1C.

Figure 1B:
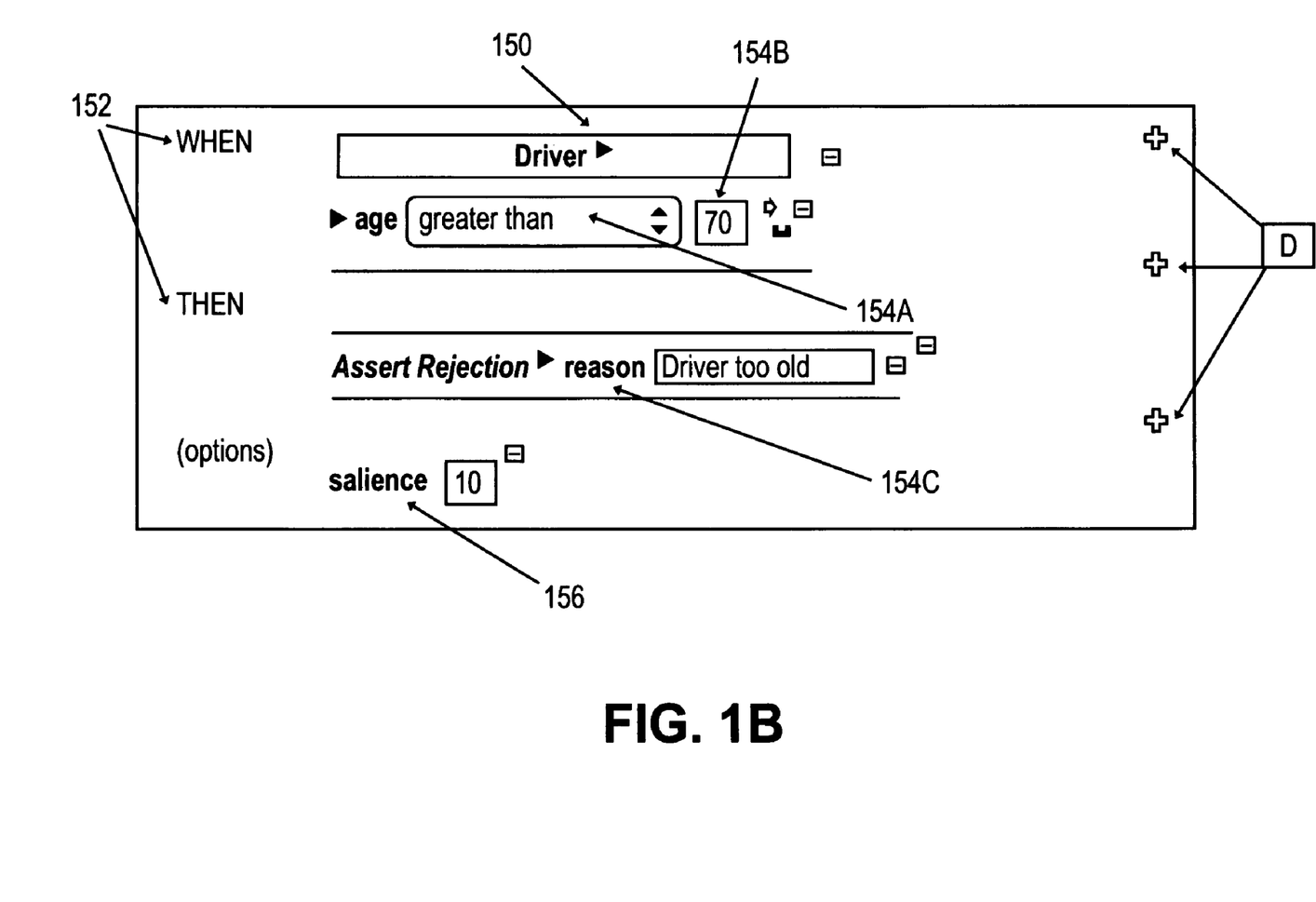
FIG. 1B illustrates one embodiment of a rule template.

FIG. 1B illustrates one embodiment of a rule template for composing a rule. Referring to FIG. 1B, the rule template 150 includes a "when-then" sentence structure 152, user input fields 154A-154C, and a salience field 156. The rule template 150 is derived from an exemplary prefabricated sentence: "When age of driver exceeds 70, then reject automobile insurance application because driver is too old." When processing logic parses the prefabricated sentence above, the structure of the sentence is extracted, namely, "when-then." The "when-then" sentence structure 152 is reproduced in the rule template 150. The user input fields 154A-154C are inserted into the "when-then" sentence structure 152 to allow users to input and/or select a predefined operator, a numerical value, and an alphanumeric string, respectively. For example, a user has selected a "greater than" operator in the field 154A, and input a value of "70" in the field 154B and the string "driver too old" in the field 154C. The rule template 150 further includes a salience field 156 to allow the user to enter a salience value for the rule composed. The salience value indicates the priority or importance of the rule with respect to other rules. Note that user input fields for other options or properties of the rule may be added into the rule template 150 in different embodiments.

Figure 1C:
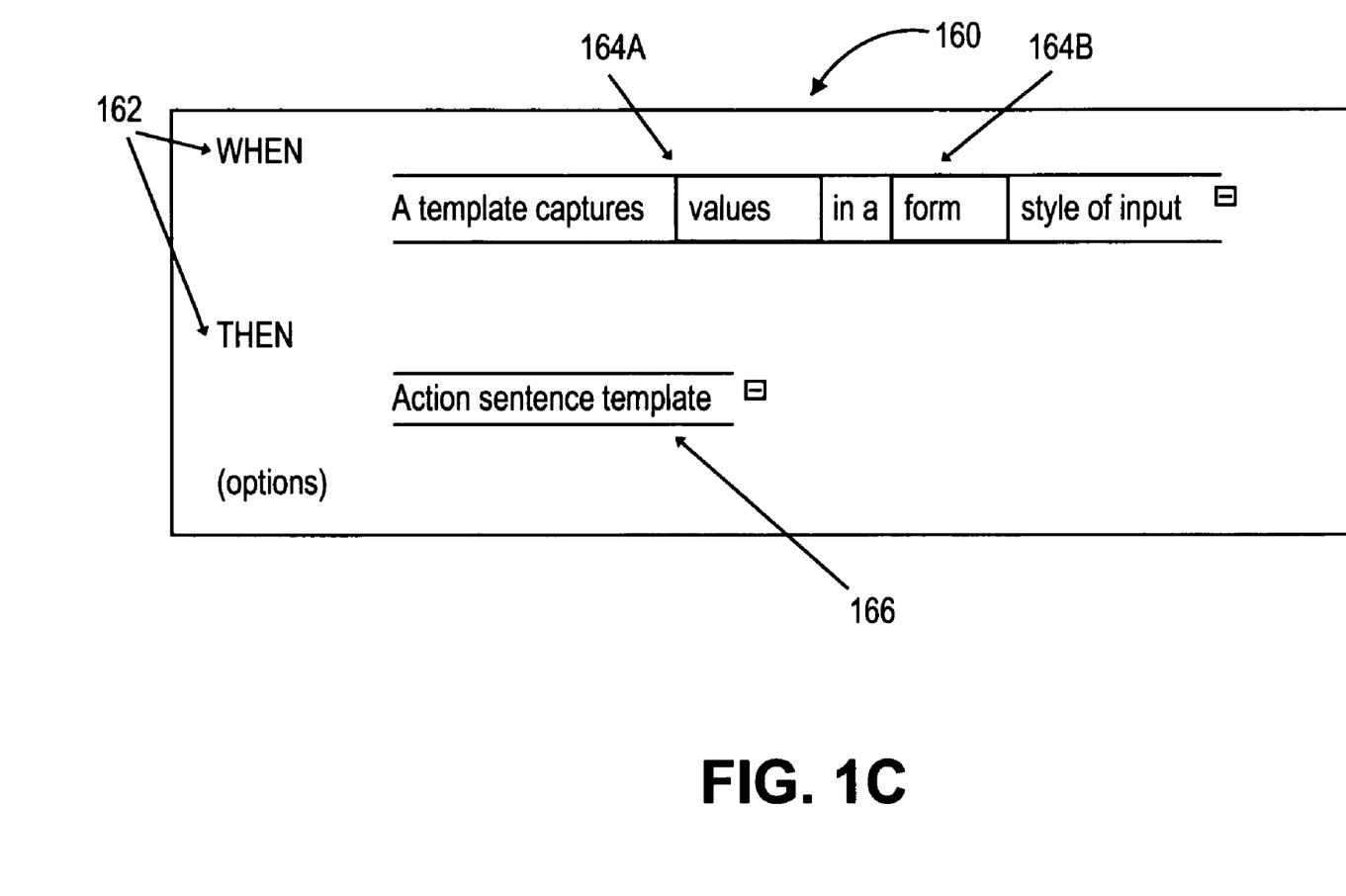
FIG. 1C illustrates an alternate embodiment of a rule template.

An alternate embodiment of a rule template is shown in FIG. 1C. The rule template 160 includes a "when-then" sentence structure 162, user input fields 164A and 164B, and an embedded template 166. Similar to the rule template 150 shown in FIG. 1B, the rule template 160 is also derived from a prefabricated sentence having a "when-then" sentence structure. The user input fields 164A and 164B allow users to input numeric values and/or alphanumeric strings. In addition, the rule template 160 includes an embedded template 166, which is an action sentence template. The action sentence template 166 is a template derived from a prefabricated sentence on action, where an action refers to the consequence to take place if the condition set forth in the rule is met.

Referring back to FIG. 1A, processing logic generates a model-driven editor (processing block 114). A model-driven editor as used herein broadly refers to a text editor that is designed primarily for human users to compose a rule and is independent of the computation and/or evaluation of the rule is performed. In some embodiments, the model-driven editor is also independent of the platform on which the BRMS is implemented. Finally, processing logic creates a user interface using the rule templates and the model-driven editor (processing block 116). For instance, the user interface may include one of the rule templates, in which the model-driven editor is embedded into the rule template.

The rule templates generated above are generally more user friendly than conventional editors used to compose rules. This is a significant advantage for the BRMS because many users of the BRMS are lay people, not professional rule engine developers who may be familiar with composing rules. Furthermore, users may compose rules faster than before using the rule templates. Moreover, users are less likely to make formal or syntax-related errors in rules composed using the rule templates.

Figure 2:
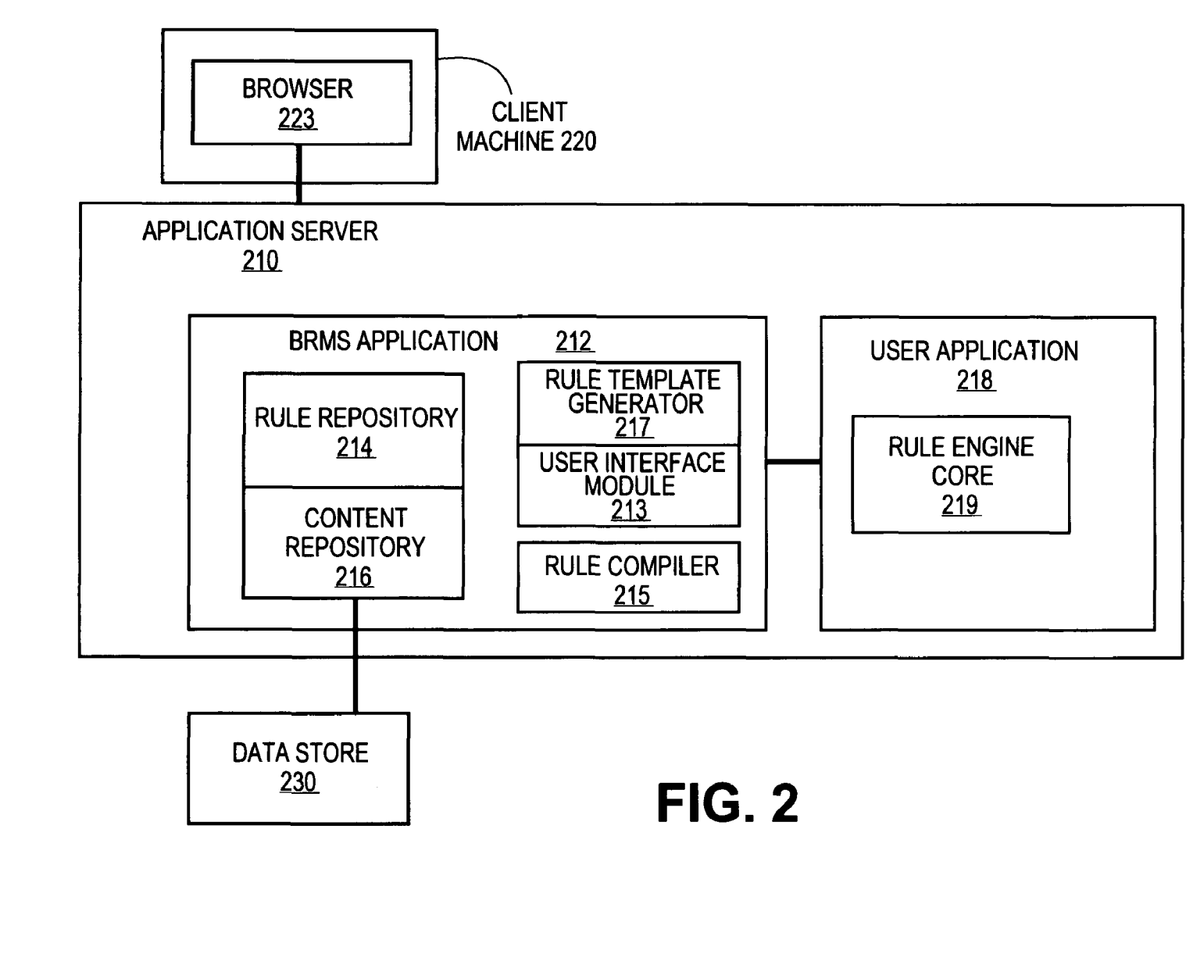
FIG. 2 illustrates a functional block diagram of one embodiment of an application server usable to implement some embodiments of the present invention.

FIG. 2 illustrates a functional block diagram of one embodiment of an application server usable to create some embodiments of the natural language enhanced user interface. The application server 210 executes a BRMS application 212 and a user application 218. The application server 210 is further coupled to a client machine 220, on which a network access application (e.g., a browser 223) is executed. The BRMS application 212 includes a rule repository 214, a content repository 216, a rule template generator 217, a user interface module 213, and a rule compiler 215. The user application 218 is operatively coupled to the BRMS application 212, and the user application 218 may include a rule engine core 219.

In some embodiments, the rule template generator 217 generates rule templates in a natural language from prefabricated sentences. As discussed above, the prefabricated sentences may include rules previously entered by users of the BRMS application 212 and rules and/or sentences entered by others (e.g., system administrators, software developers, etc.). The prefabricated sentences may be stored in the content repository 216 and/or the rule repository 214. To generate the rule templates, the rule template generator 217 may parse the prefabricated sentences to determine structures of the prefabricated sentences. Then the rule template generator 217 may create rule templates based on the structures of the prefabricated sentences. Further, the rule template generator 217 may insert user input fields into the sentence structures to allow user to enter and/or select various types of input, such as numeric values, alphanumeric strings, special characters (e.g., $, %, etc.), operators (e.g., >, <, /, +, etc.), etc. Some exemplary embodiments of the rule templates are illustrated in FIGS. 1B and 1C.

In some embodiments, the rule template generator 217 provides the rule templates created to the user interface module 213, which creates a user interface using the rule templates for users to compose rules. The user interface module 213 may further generate a model-driven editor and add the model-driven editor into the user interface created.

In some embodiments, rules composed by users using the user interface created are stored in the rule repository 214 and the rule compiler 215 may compile some or all of the rules in the rule repository 214 in response to requests from the user application 218. The rule compiler 215 provides the compiled rules to the rule engine core 219 in the user application 218 and the rule engine core 219 may evaluate the compiled rules against facts or data asserted in a working memory of the rule engine core 219. In some embodiments, the facts or data may have been retrieved from the content repository 216. The content repository 216 is a database for storing one or more types of contents, such as spreadsheet, images, records, etc. For example, the content repository 216 may include a Java content repository (e.g., Jackrabbit) to store content. Rules that result in a match against the facts or data asserted are activated. Activated rules may be fired or executed in order and/or according to their priorities as determined using a conflict resolution scheme.

Figure 3:
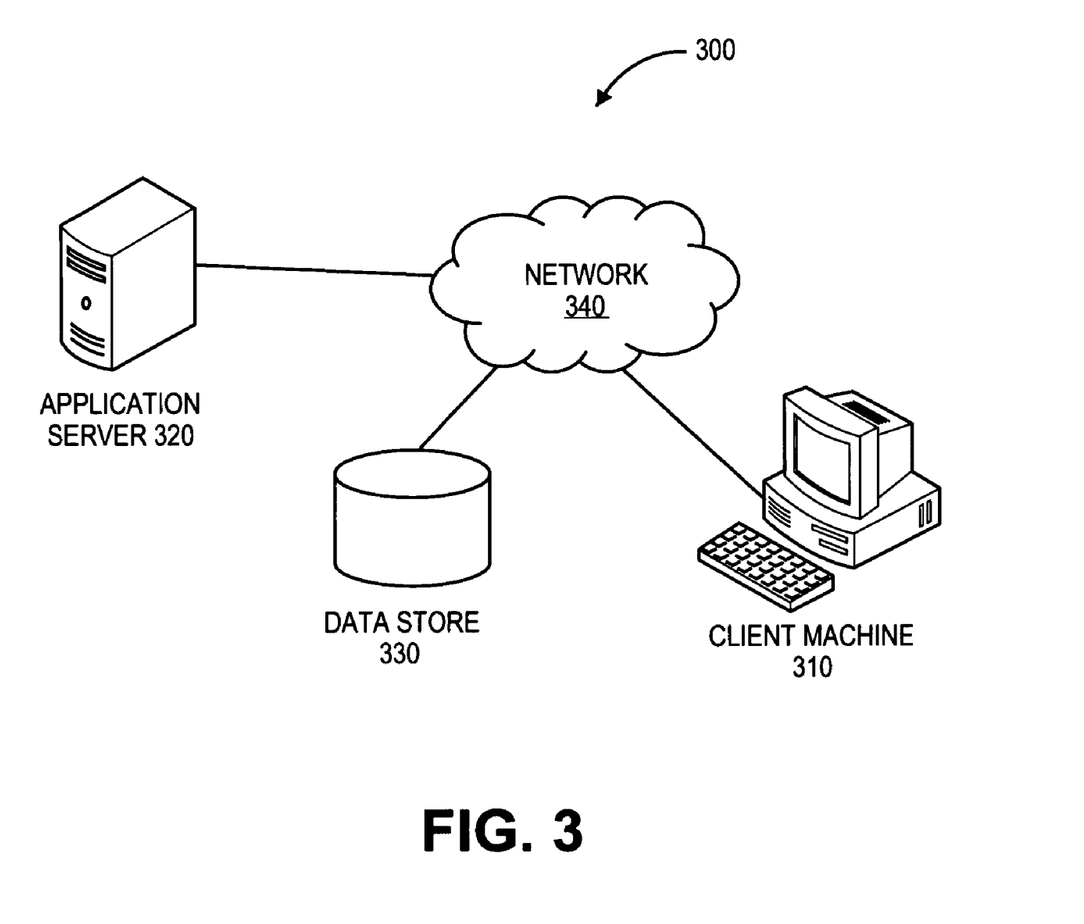
FIG. 3 illustrates one embodiment of a system in which embodiments of the present invention may be implemented.

FIG. 3 illustrates one embodiment of a system in which embodiments of the present invention may be implemented. The system 300 includes a client machine 310, an application server 320, a data store 330, and a network 340. The client machine 310, the application server 320, and the data store 330 are communicatively coupled to each other via the network 340. Furthermore, the network 340 may include different types of network, such as local area network (LAN), wide area network (WAN), etc. The application server 320 implements a BRMS integrated with continuous QA, such as the application server 210 shown in FIG. 2.

In some embodiments, a user may submit a change to the rules in a rule repository of the BRMS on the application server 320 via the client machine 310. The BRMS implemented on the application server 320 has a user interface module and a rule template generator. The rule template generator may generate rule templates from prefabricated sentences as described above and the user interface module may use the rule templates to create user interface for users to compose rules. The users may access the user interface via a network access application (e.g., a browser, an electronic mail engine, a special-purpose reporting user interface, etc.) being executed on the client machine 310.

Figure 4:
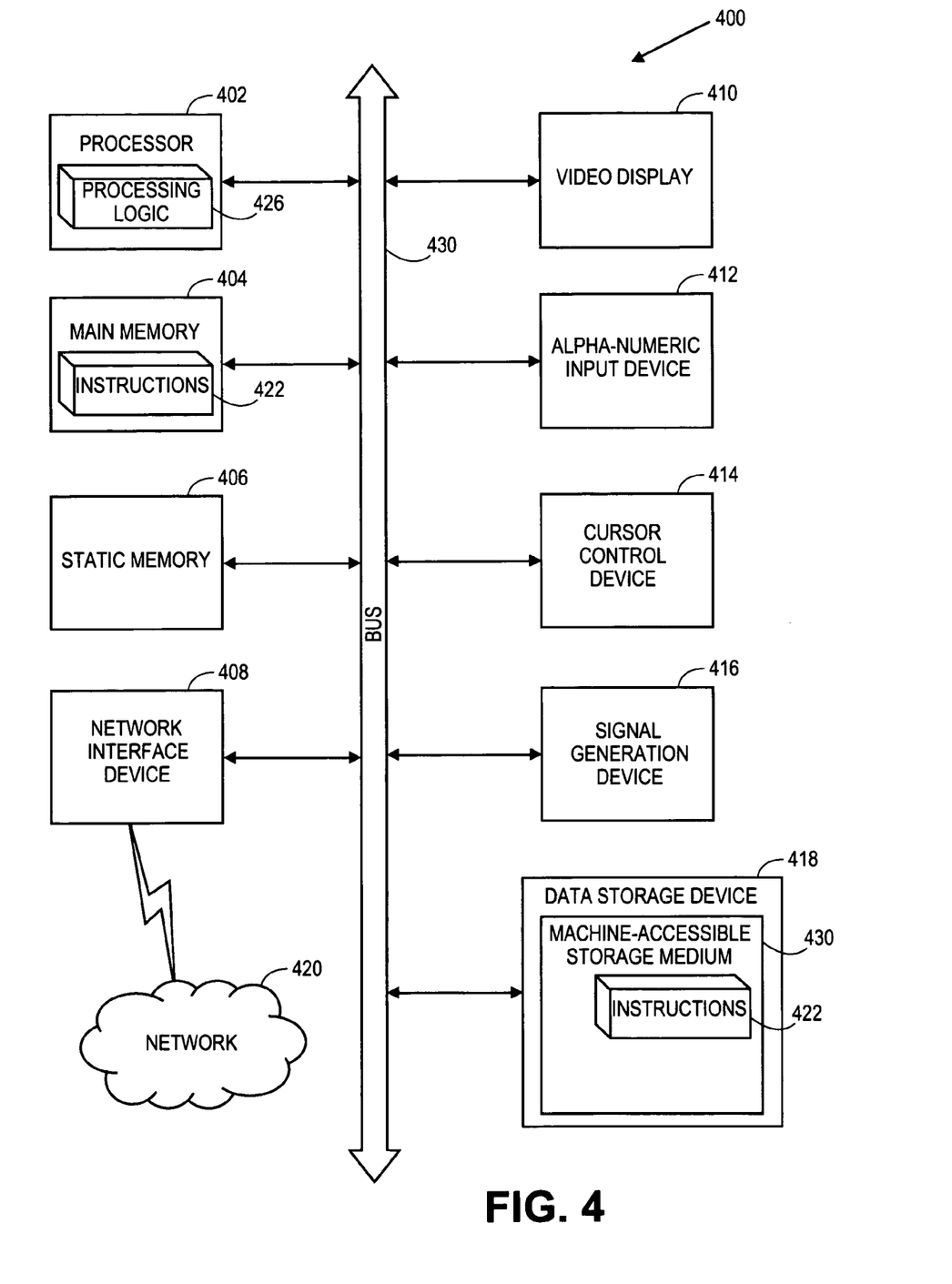
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc. One example of the machine-accessible storage medium is a computer readable medium, which may include any medium that is capable of storing, encoding or carrying a set of instructions to be read and/or executed by a computer, such as ROM, RAM, CD-ROM, flash memory, cache devices, optical disks, magnetic disks, etc.

Thus, some embodiments of a natural language enhanced user interface in a BRMS have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
receiving, by an application server computing machine, text composed and submitted by an end user, wherein the text is written by the end user in a natural language without use of a template;
generating, by the application server computing machine, a rule template in the natural language from the received text, wherein the generating the rule template further comprises:
parsing the received text to determine a structure of the text;
creating the rule template by reproducing the determined structure in the rule template; and
inserting fields into the rule template to enable the end user to modify the rule template; and
creating, by the application server computing machine, a user interface using the rule template to allow a user of the application server computing machine to compose rules for a business rule management system.

2. The method of claim 1, wherein the fields allow the user to enter a string of alphanumeric characters, wherein positions of the fields in the rule template corresponds to positions of nouns in the text.

3. The method of claim 1, wherein the fields allow the user to enter a numeric value, wherein positions of the fields in the rule template corresponds to positions of numerical values in the text.

4. The method of claim 1, wherein generating the rule template comprises:
inserting a list of one or more predetermined operators in the rule template, wherein a position of the list in the rule template corresponds to a position of an operator in the text ; and
providing a user interface control in the user interface to allow the user to select an operator from the list of one or more predetermined operators.

5. The method of claim 1, wherein generating the rule template comprises:
creating a field associated with the rule template to allow the end user to enter a numeric value, wherein the numeric value is indicative of a property of a rule composed using the rule template.

6. The method of claim 1, wherein the natural language is English.

7. The method of claim 1, further comprising:
generating a model-driven editor in the user interface.

8. An apparatus comprising:
a memory; and
a processing device to execute a business rule management system (BRMS) application from the memory, the BRMS application operable to receive text composed and submitted by an end user, wherein the text is written by the end user in a natural language without the use of a template, wherein the BRMS application further comprising:
a rule template generator to generate a rule template in the natural language from the text , wherein the rule template generator is further configured to:
parse the received text to determine a structure of the text;
create the rule template by reproducing the determined structure in the rule template; and
insert fields into the rule template to enable the end user to modify the rule template; and
a user interface module coupled to the rule template generator, the user interface module configured to create a user interface using the rule template allow at least one of the end user or another user to compose rules for the BRMS application.

9. The apparatus of claim 8, wherein the fields allow the user to enter a string of alphanumeric characters, wherein positions of the fields in the rule template corresponds to positions of nouns in the text.

10. The apparatus of claim 8, wherein the fields allow the user to enter a numeric value, wherein positions of the fields in the rule template corresponds to positions of numerical values in the text.

11. The apparatus of claim 8, wherein the rule template generator is operable to insert a list of one or more predetermined operators in the rule template, wherein a position of the list in the rule template corresponds to a position of an operator in the text , and wherein the user interface module is operable to create a user interface control in the user interface to allow the user to select an operator from the text.

12. The apparatus of claim 8, wherein the rule template generator is operable to create a field associated with rule template to allow users to enter a numeric value, wherein the numeric value is indicative of a property of a rule composed using the rule template.

13. The apparatus of claim 8, wherein the natural language is English.

14. The apparatus of claim 8, wherein the user interface module is further operable to generate a model-driven editor in the user interface.

15. The apparatus of claim 8, wherein the BRMS application further comprises:
a rule repository to store the rules composed using the user interface; and
a rule engine coupled to the rule repository, to evaluate and execute the rules.

16. A non-transitory computer readable medium that provides instructions that, when executed by a processing device, will cause the processing device to perform operations comprising:
receiving, by an application server computing machine including the processing device, text composed and submitted by an end user, wherein the text is written by the end user in a natural language without use of a template;
generating, by the application server computing machine, a rule template in the natural language from the received text , wherein the generating the rule template further comprises:
parsing the received text to determine a structure of the text;
creating the rule template by reproducing the determined structure in the rule template; and
inserting fields into the rule template to enable the end user to modify the rule template; and
creating, by the application server computing machine, a user interface using the rule template to allow a user of the application server computing machine to compose rules for a business rule management system.

17. The computer readable medium of claim 16, wherein the fields allow the user to enter a string of alphanumeric characters, wherein positions of the fields in the rule template corresponds to positions of nouns in the text.

18. The computer readable medium of claim 16, wherein the fields allow the user to enter a numeric value, wherein positions of the fields in the rule template corresponds to positions of numerical values in the text.

19. The computer readable medium of claim 16, wherein generating the rule template comprises:

inserting a list of one or more predetermined operators in the rule template, wherein a position of the list in the rule template corresponds to a position of an operator in the text ; and providing a user interface control in the user interface to allow the user to select an operator from the list of one or more predetermined operators.

20. The computer readable medium of claim 16, wherein generating the rule template comprises:

creating a field associated with the rule template to allow the end user to enter a numeric value, wherein the numeric value is indicative of a property of a rule composed using the rule template.

21. The computer readable medium of claim 16, wherein the natural language is English.

22. The computer readable medium of claim 16, wherein the operations further comprise:

generating a model-driven editor in the user interface.

\* \* \* \* \*